US006994653B2

(12) United States Patent
Hartmann et al.

(10) Patent No.: US 6,994,653 B2

(45) Date of Patent: Feb. 7, 2006

(54) METHOD AND ARRANGEMENT FOR CONTROLLING THE INTERNAL COMBUSTION ENGINE OF A VEHICLE

(75) Inventors: Dirk Hartmann, Stuttgart (DE); Holger Jessen, Ludwigsburg (DE); Mathieu Courtes, Paris (FR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/456,500

(22) Filed: Jun. 9, 2003

(65) Prior Publication Data

US 2004/0007205 A1 Jan. 15, 2004

(30) Foreign Application Priority Data

Jun. 8, 2002 (DE) ................................ 102 25 448

(51) Int. Cl.
*B60K 41/06* (2006.01)

(52) U.S. Cl. ....................................... 477/107; 477/101

(58) Field of Classification Search ................ 477/107, 477/110, 101, 102, 109
See application file for complete search history.

(56) References Cited

U.S. PATENT DOCUMENTS 4,724,723 A * 2/1988 Lockhart et al. ............ 477/109
4,787,044 A * 11/1988 Nagata et al. .............. 701/110
5,253,623 A * 10/1993 Melnyk et al. ........ 123/339.11
5,265,498 A * 11/1993 Fodale et al. ............... 477/109
5,559,694 A * 9/1996 Kraemer et al. ........... 477/109
5,568,387 A * 10/1996 Andersson .................. 477/109
5,679,093 A * 10/1997 Desautels et al. ........... 477/109
5,765,527 A * 6/1998 Lehner et al. .......... 123/339.1
5,947,863 A * 9/1999 Grob et al. ................. 477/109
6,131,546 A 10/2000 Vogt et al.
6,154,701 A * 11/2000 Loffler et al. ............... 477/110
6,155,230 A * 12/2000 Iwano et al. ................ 477/109
6,360,154 B1 * 3/2002 Krenn et al. ................ 477/155
6,418,365 B1 * 7/2002 Loffler et al. ............... 477/115
6,652,418 B1 * 11/2003 Gutknecht-Stohr et al. . 477/120

FOREIGN PATENT DOCUMENTS

DE 42 32 973 4/1994
FR 2 809 059 11/2001

* cited by examiner

*Primary Examiner*—Sherry Estremsky
(74) *Attorney, Agent, or Firm*—Walter Ottesen

(57) ABSTRACT

A method for controlling an internal combustion engine of a vehicle makes possible an acceleration of the shift operation especially of an automatic transmission or of an automated manually shifted transmission of the vehicle. In a shift operation, an operating state quantity of the engine is pregiven. This operating state quantity can be especially an engine output torque (MDES) or an engine rpm (NMOTDES). Furthermore, a torque reserve (MRES1, MRES2, MRES3) is pregiven for a rapid adjustment of the pregiven operating state quantity.

14 Claims, 5 Drawing Sheets

METHOD AND ARRANGEMENT FOR CONTROLLING THE INTERNAL COMBUSTION ENGINE OF A VEHICLE

BACKGROUND OF THE INVENTION

Known methods for controlling the shift operation in automated manually shifted transmissions utilize torque desired values or rpm desired values, which act as operating state inputs for the internal combustion engine or the motor in lieu of a driver command torque or other interventions, for example, a drive slip control, an engine drag control or the like. The control takes place in different phases wherein suitable time-dependent courses of the engine torque or engine rpm are pregiven by a transmission control apparatus via the torque desired values or the rpm desired values. In a known manner, for example, the spark-ignition engine has a dynamic which leads to the situation that the desired value inputs are actually not converted immediately. This dynamic is caused by the physical characteristics of the intake manifold.

SUMMARY OF THE INVENTION

The method and arrangement of the invention afford the advantage with respect to the above that, in a shift operation, also a torque reserve is pregiven for a rapid adjustment of the pregiven operating state quantity. In this way, the dynamic characteristics of the engine can be improved in a short time with the torque reserve made available so that deviations between a desired state and an actual state of the operating state quantity can be compensated more rapidly. The error, which is caused by the delayed conversion of the pregiven operating state quantity, thereby becomes less. In this way, the time-dependent course of the shift operation in an automatic transmission or an automated manually shifted transmission is accelerated or improved in that a better correspondence is ensured between the desired value and the actual value of the pregiven operating state quantity.

It is especially advantageous when the torque reserve is inputted in dependence upon a difference between the pregiven operating state quantity and an instantaneous value of the operating state quantity. In this way, the torque reserve can be adapted to the deviation of the actual value of the operating state quantity from its desired value.

It is also advantageous that the torque reserve is pregiven in dependence upon a driver command torque or an instantaneous engine rpm. In this way, the torque reserve can be adapted to the instantaneous driving situation.

It is especially advantageous when the torque reserve is pregiven in dependence upon the instantaneous phase of the shift operation and/or a subsequent phase of the shift operation. In this way, the torque reserve can be adapted to the different requirements during the shift operation. In this way, the time-dependent course of the shift operation can be further accelerated and improved because of a still better correspondence between the desired value and the actual value of the pregiven operating state quantity. The deviations between the desired value and the actual value of the pregiven operating state quantity can thereby be more rapidly compensated also in the individual phases of the shift operation.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
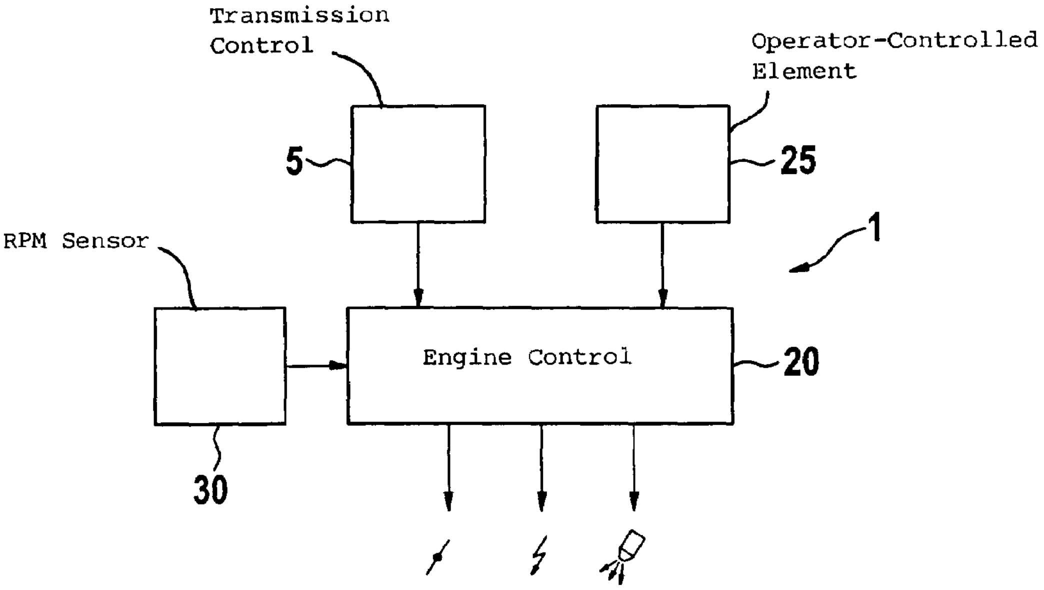
FIG. 1 is a block circuit diagram of an arrangement according to the invention.

FIG. 1 is a section of an internal combustion engine 1, for example, of a motor vehicle in the form of a block circuit diagram. The internal combustion engine 1 includes an engine control 20. A transmission control 5, an rpm sensor 30 and an operator-controlled element 25 are connected to the engine control 20 The operator-controlled element 25 can be an accelerator pedal of the motor vehicle. The rpm sensor 30 measures the engine rpm of the engine 1 and conducts the measured value to the engine control 20. In this example, and for a spark-ignition engine, the engine control 20 controls the following: an air supply via a throttle flap, an ignition time point and an injection quantity of fuel as shown schematically in FIG. 1 in order to convert a pregiven operating state quantity of the engine 1. The pregiven operating state quantity of the engine 1 can, for example, be a desired value for an engine output torque MDES or a desired value for an engine rpm NMOTDES. In FIG. 1, and for the sake of clarity, only the elements of the engine 1 are shown which are needed for the explanation of the method and arrangement of the invention.

The engine control 20 receives a driver command torque MFW as an input value MDES for the engine output torque from the accelerator pedal 25. The engine output torque is transmitted to the drive wheels of the vehicle via an automatic transmission (not shown in FIG. 1) or an automated manually shifted transmission. The automatic transmission or the automated manually shifted transmission are referred to in the following as a transmission. The invention is generally usable for any rpm control or any desired type of transmission and indeed, generally, for rpm control. In a shift operation of the transmission, the transmission control 5 pregives the desired value MDES for the engine output torque. The engine output torque is identified in the following as a first operating state quantity of the internal combustion engine 1. In a shift operation of the transmission, the transmission control 5 furthermore outputs a desired value NMOTDES for the engine rpm which is identified in the following as a second operating state quantity.

In a shift operation of the transmission, it is provided in accordance with the invention that the engine control 20 outputs a torque reserve MRES for a rapid adjustment of the particular operating state quantity, that is, the engine output torque or the engine rpm in the above-described example. The pregiven torque reserve MRES can be adjusted by the engine control 20, for example, by a shift of ignition angle, especially, via a retardation of the ignition angle. In addition, or alternatively, the pregiven torque reserve can be adjusted by the engine control 20 also by a reduction of the fuel injection quantity. The first-mentioned measure for adjusting the above-mentioned torque reserve MRES is identified in the following also as an ignition angle path and the second-mentioned measure is also characterized as an injection path in the following.

When the desired value MDES for the engine output torque or the desired value NMOTDES for the engine rpm is requested by the transmission control 5 during a shift operation, then the desired value can rapidly be adjusted based on the formed torque reserve via a retardation of the ignition angle toward advance and/or by an increase of the injection quantity of the fuel.

Figure 3:
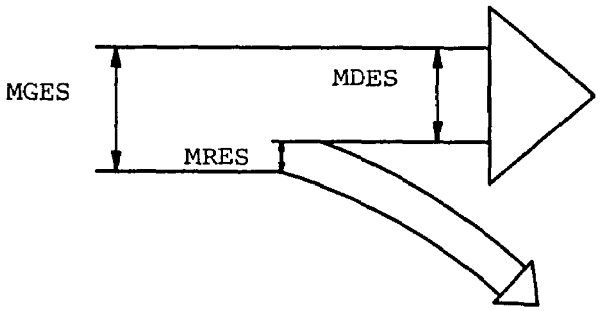
FIG. 3 is a schematic representation for the formation of a total torque.

This is shown schematically by way of example in FIG. 3 for the engine output torque as a first operating state quantity. The desired value MDES for the engine output torque is pregiven by the transmission control 5. For the rapid adjustment of this desired value MDES, the engine control 20 outputs the torque reserve MRES. The torque reserve MRES is an additional potential for a rapid torque build-up with this potential being made available by the engine 1 in addition to the desired value MDES of the engine output torque. In total, a potential for a total torque MGES is requested by the internal combustion engine 1 which is formed from the sum of the desired value MDES for the engine output torque and the desired value MRES for the torque reserve. This total torque MGES is adjusted by the engine control 20 by adjusting a suitable charge and a corresponding drive of the throttle flap and therefore the air supply to the engine.

The torque reserve MRES can be pregiven by the engine control 20 in dependence upon a difference between the desired value for the particular operating state characteristic variable and an actual value or instantaneous value of this operating state quantity. The torque reserve MRES can be pregiven by the engine control 20 additionally or alternatively also in dependence upon the instantaneous driving situation, for example, it is characterized by the driver command torque MFW or the instantaneous engine rpm NMOTACT. In addition, or alternatively and in an especially advantageous manner, it can be provided that the engine control 20 pregives the torque reserve MRES in dependence upon the instantaneous phase of the shift operation and/or a subsequent phase of the shift operation.

Figure 2A:
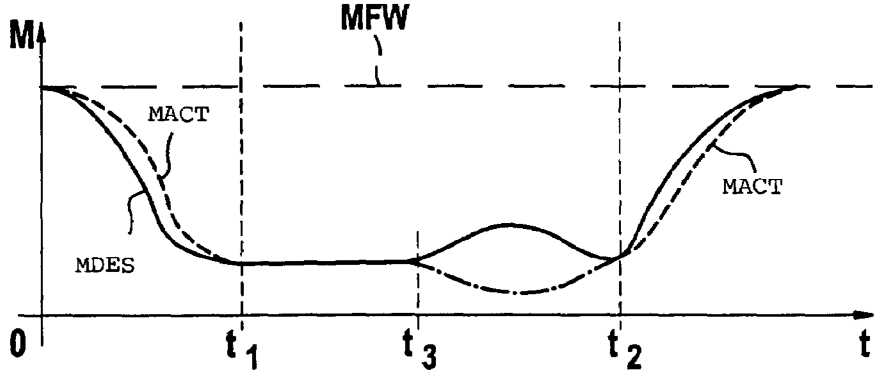
FIG. 2*a* is a graph showing the course of the torque as a function of time in a shift operation.

Various phases of the shift operation are shown in FIG. 2. In FIG. 2*a*, the course of the engine output torque M as a function of time (t) is shown. It is, for example, assumed that the driver keeps the accelerator pedal position during the shift operation of the transmission and therefore requests an approximately constant driver command torque MFW. This driver command torque MFW is transmitted from the accelerator pedal to the engine control 20. However, in a shift operation, it is not the driver command torque MFW which is converted by the engine control 20 but the engine output torque MDES requested by the transmission control 5. A first phase of the shift operation takes place up to a first time point $t_1$ and is characterized by the opening of the clutch. During this first phase of the shift operation, the desired value MDES for the engine output torque. which is requested by the transmission control 5, drops off as shown in FIG. 2*a*. The actual value MACT of the engine output torque is made to track the desired value MDES of the engine output torque by the engine control 20 and is shown in FIG. 2*a* by the broken line. This tracking can take place via the so-called charge path, that is, via the control of the air supply by means of the throttle flap. Compared to the ignition angle path and the injection path, the charge path is the least dynamic path or the slowest path. A more rapid tracking of the actual value MACT of the engine output torque is achieved when, additionally, a first torque reserve MRES1 is pregiven and built up by the engine control 20 in this first phase of the shift operation. This can, for example, be achieved via the ignition angle path by retarding the ignition angle or it can be achieved via the injection path by reducing the injected quantity. If, in addition to the reduction of the charge, the ignition angle is retarded and/or the injection quantity is reduced, the actual value MACT of the engine output torque can track the pregiven desired value MDES more rapidly. In this way, the first torque reserve MRES1 effects more rapid compensation of the deviation between the actual value MACT and the desired value MDES of the engine output torque in the first phase of the shift operation. As not shown in FIG. 2*a*, if it should happen that the transmission control 5 requests a short-term increase of the desired value MDES of the engine output torque during the first phase of the shift operation, then this increase can be realized by the engine control 20 via at least a partial reduction of the already-formed first torque reserve MRES1. A precondition is that the formed first torque reserve MRES1 is sufficiently high. The first torque reserve MRES1 makes it possible for the engine control 20 to accommodate as rapidly as possible the requests of the transmission control 5 on the engine output torque in the first phase of the shift operation especially because these requests are not known in advance by the engine control 20. In this way, it is ensured that the engine output torque MDES is converted as rapidly as possible by the engine control 20 in the sense of matching as rapidly as possible the actual value MACT of the engine output torque to the desired value MDES of the engine output torque. The engine output torque MDES is pregiven by the transmission control 5 in the first phase of the shift operation. The first torque reserve MRES1 is to be formed as close as possible to the start of the first phase of the shift operation so that it is timely available.

Figure 5:
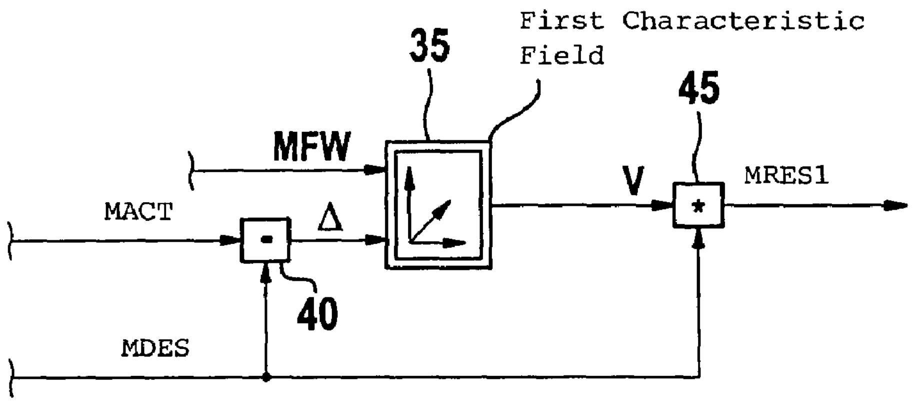
FIG. 5 is a block circuit diagram for forming a torque reserve in a first phase of a shift operation in accordance with a first embodiment.

In FIG. 5, a block circuit diagram for a first embodiment for realizing the first torque reserve MRES1 is shown. This block circuit diagram is realized in the engine control 20. The actual value MACT of the engine output torque is supplied by a determination device (not shown in FIG. 1) to the engine control 20 additionally. The measurement of the actual value MACT is not easily possible. In lieu of complex sensors, a model for determining the actual value MACT is used by the determination device. Likewise, the engine control 20 is provided with still another information which indicates the instantaneous phase of a shift operation. This information is present in the form of a clutch bit KB. According to FIG. 5, a first logic position 40 is provided wherein a difference Δ is formed between the actual value MACT and the desired value MDES of the engine output torque. The difference Δ=MACT−MDES is supplied to a first characteristic field 35 as an input quantity. As a further input quantity, the driver command torque MFW is supplied to the first characteristic field 35. The first characteristic field 35 determines an amplification factor V from the two above-mentioned input quantities. In a second logic position 45, the desired value MDES of the engine output torque is multiplied by the amplification factor V. From this, the first pregiven torque MRES1 results.

Figure 6:
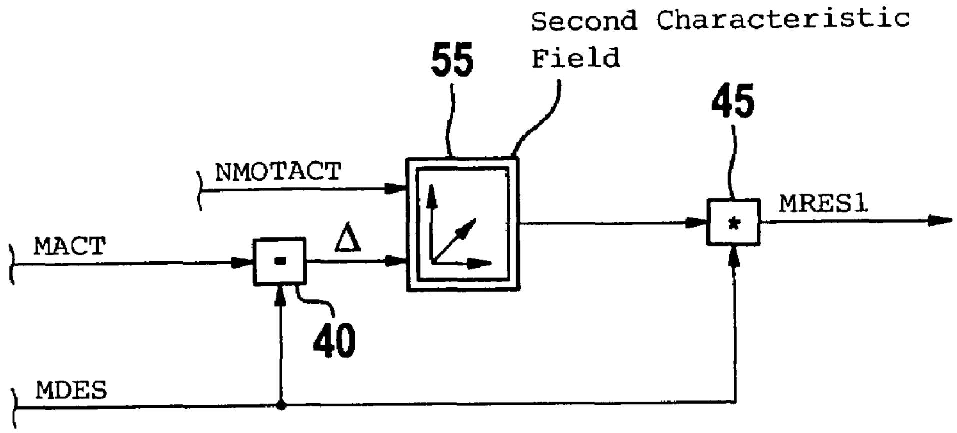
FIG. 6 is a block circuit diagram for a formation of the torque reserve in the first phase of a shift operation in accordance with a second embodiment.

In FIG. 6, the same reference numerals are used to identify the same elements as in FIG. 5. According to the alternate embodiment of FIG. 6, the difference Δ is again formed in the first logic position 40 between the actual value MACT and the desired value MDES of the engine output torque, wherein Δ=MACT−MDES. The difference Δ is supplied to a second characteristic field 55 as an input quantity and an additional input quantity of the characteristic field 55 is the instantaneous engine rpm NMOTACT which is supplied to the engine control 20 by the rpm sensor 30. The second characteristic field 55 determines the amplification factor V from the two above-mentioned input quantities. The amplification factor V is multiplied by the desired value MDES of the engine output torque in the second logic position 45 in order to form the first torque reserve MRES1. In this way, the first predetermined torque reserve MRES1 can, on the one hand, be determined in dependence upon the difference Δ and, on the other hand, be determined in dependence upon the driver command torque MFW in the embodiment of FIG. 5 or can be determined in dependence upon the instantaneous engine rpm NMOTACT in the embodiment of FIG. 6. The driver command torque MFW (which can remain, for example, constant during the shift operation as indicated in FIG. 2*a*) and the instantaneous engine rpm NMOTACT characterize the instantaneous driving situation.

Figure 2B:
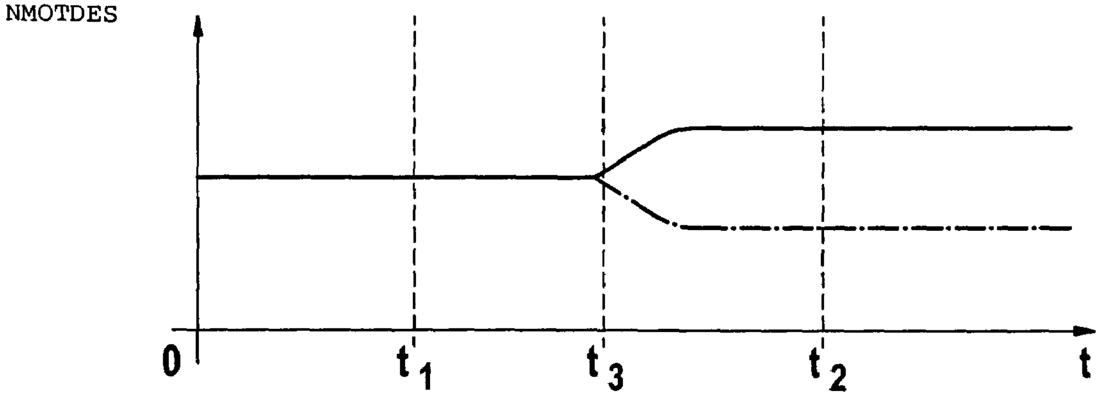
FIG. 2*b* shows the course of the engine speed (rpm) as a function of time in a shift operation.

The second phase of the shift operation extends from the first time point $t_1$ up to a second time point $t_2$. In this second phase, a new gear or a new gear stage is set by the transmission. If a lower gear is set, then, in the second phase, the desired value NMOTDES for the engine speed is increased as shown in FIG. 2*b* by the curve of the solid line. In FIG. 2*b*, the course of the desired value NMOTDES of the engine rpm is shown as a second operating state quantity over the time (t) during the shift operation. The increase of the desired value NMOTDES of the engine rpm is initiated at a third time point $t_3$ which lies in the second phase between the first time point $t_1$ and the second time point $t_2$. This desired value is connected to a short-term increase and a subsequent lowering of the desired value MDES of the engine output torque as can be seen in FIG. 2*a* between the third time point $t_3$ and the second time point $t_2$. When upshifting, an opposite course correspondingly results, that is, a drop of the desired value NMOTDES of the engine rpm from the third time point $t_3$ on in accordance with the dot-dash line in FIG. 2*b* and a short-term drop and follow-on increase of the desired value MDES of the engine output torque in accordance with the dot-dash line in FIG. 2*a* between the third time point $t_3$ and the second time point $t_2$ in the second phase. In the second phase, it is of primary importance that there is a rapid adjustment of the desired value NMOTDES for the engine rpm. The second phase is therefore also characterized as rpm control phase. The engine rpm can, for example, be controlled by means of a PID-controller 60 within the engine control 20. Here, a difference ΔN between the actual value NMOTACT and the desired value NMOTDES of the engine rpm are supplied to the PID-controller 60. The difference ΔN of the engine rpm results, for example, as ΔN=NMOTACT−NMOTDES.

Figure 4:
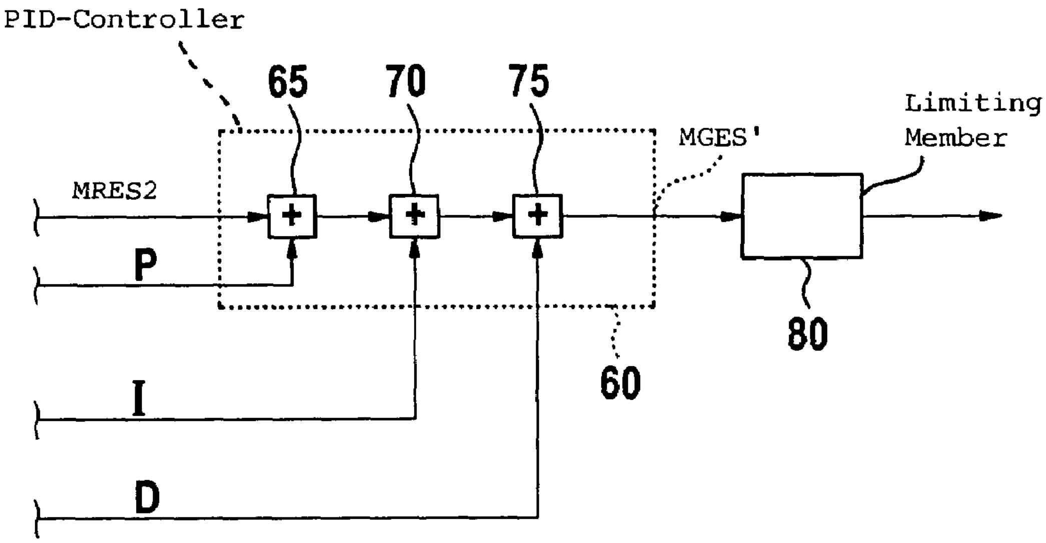
FIG. 4 is a block circuit diagram for a control of rpm.

At a third logic position 65, a P-component P of the PID-controller 60 is added to a second torque reserve MRES2. An I-component I of the PID-controller is added to the sum formed in a fourth logic position 70. A D-component D of the PID-controller 60 is then added to the sum formed here in a fifth logic position 75. The sum formed in this way is identified in FIG. 4 by MGES' and defines the output of the PID-controller 60. The output MGES' of the PID-controller 60 is supplied to a limiting member 80 which limits the output MGES', as required, upwardly to an upper permissible torque limit or downwardly to a lower permissible torque limit. The output of the limiting member 80 is the desired value for the total torque MGES. This total torque corresponds to the output MGES' of the PID-controller 60 when the output MGES' neither exceeds the upper permissible torque limit nor drops below the lower permissible torque limit.

In the case of a downshifting into the second phase of the shift operation, a short-term increase of the desired value MDES of the engine output torque is required in order that the actual value NMOTACT of the engine rpm tracks the increased desired value NMOTDES. So that this can take place in the most rapid way possible, a second pregiven torque reserve MRES2 is to be formed by the engine control 20 as early as possible in the second phase (that is, already between the first time point $t_1$ and the third time point $t_3$) and, in accordance with FIG. 3, the corresponding total torque MGES is to be made available via the charge path. The second torque reserve MRES2 results, in turn, from the adjustment of the ignition angle path and/or the injection path.

Figure 7:
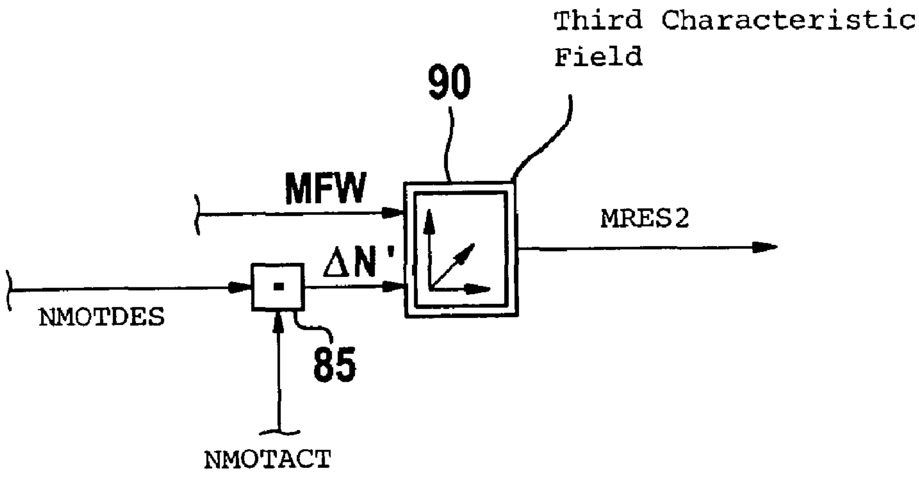
FIG. 7 is a block circuit diagram for a formation of torque reserve in a second phase of the shift operation.

In FIG. 7, a block circuit diagram for forming the second torque reserve MRES2 is shown. In a sixth logic position 85, the difference ΔN' is formed for the second phase of the shift operation from the desired value NMOTDES and the actual value NMOTACT of the engine rpm, for example, as follows: ΔN'=NMOTDES−NMOTACT.

The desired value NMOTDES of the engine rpm is pregiven for the second phase of the shift operation by the transmission control 5; whereas, the actual value NMOTACT of the engine rpm is received in the engine control 20 from the rpm sensor 30. The block circuit diagram of FIG. 7 is, for example, realized, in turn, in the engine control 20. The difference ΔN' of the engine rpm is an input quantity of a third characteristic field 90. A further input quantity of the third characteristic field 90 is the driver command torque MFW. In an alternate embodiment, the input quantity could also be the instantaneous rpm NMOTACT. From the above-mentioned input quantities of the third characteristic field 90, the second predetermined torque reserve MRES2 can, for example, be derived directly.

The same applies also for upshifting in the second phase wherein a short-term drop and subsequent increase of the desired value MDES of the engine output torque is required between the third time point $t_3$ and the second time point $t_2$ for lowering the desired value NMOTDES of the engine rpm.

With the second pregiven torque reserve MRES2, an adaptation of the actual value NMOTACT to the desired value NMOTDES of the engine rpm can be obtained especially rapidly.

Usually, it is known already at the beginning of the first phase whether, in the second phase, there is to be an upshifting or a downshifting. Correspondingly, the first predetermined torque reserve MRES1 can be pregiven in the first phase of the shift operation already in dependence upon the jump in engine rpm to be expected from the second phase so that at the beginning of the second phase, at most only slight corrections are to be carried out on the torque reserve in dependence upon the difference ΔN' of the engine rpm in order to form the second pregiven torque reserve MRES2. There can therefore be a start of the increase of the desired value NMOTDES of the engine rpm already at the first time point $t_1$ or shortly thereafter so that the second phase can be still further considerably shortened and, above all, the time difference between the third time point $t_3$ and the first time point $t_1$ can be virtually eliminated. In this way, the shift operation is further accelerated.

Generally, a torque reserve is not needed for a reduction of the desired value MDES of the engine output torque. This torque reserve is nonetheless purposeful for the first phase of the shift operation in the following three cases.

In the first case, the first pregiven torque reserve MRES1 makes possible, as described, also a short-term conversion of a short-term desired torque increase pregiven by the transmission control 5. The first pregiven torque reserve MRES1 should be selected to be as small as possible in order to just be sufficient for the desired torque increases in the first phase which possibly occur for a short time. Otherwise, the adjustment of the actual value MACT to the desired value MDES of the engine output torque can be tracked very rapidly via the charge path by reducing the degree of opening of the throttle flap because the air supply can be reduced very rapidly in this way. The first pregiven torque reserve MRES1 is to be held as low as possible and with this torque reserve MRES1, the total torque MGES must not be adjusted to be significantly greater than the desired value MDES of the engine output torque. This variation affords the advantage that the torque tracking takes place primarily via the charge path and therefore leads to low raw emission components in the exhaust gas and to a reduction in fuel consumption. In the second variation, as described, an adaptation of the actual value MACT to the falling desired value MDES of the engine output torque can likewise take place via the charge path as well as via the ignition angle and/or the injection path and can therefore be accelerated. In this second variation, a larger first torque reserve MRES1 is, as a rule, therefore realized than in the first variation. In this way, the actual value MACT can be adapted still more rapidly to the desired value MDES of the engine output torque than in the first variation. The first phase of the shift operation can be shortened in this way; however, this takes place at the cost of the raw emission component in the exhaust gas and of the fuel consumption. The third variation builds upon the second variation and uses the first torque reserve MRES1, which is formed for the rapid reduction of the engine output torque, also for the second phase of the shift operation. The first torque reserve MRES1 is already pregiven in the first phase of the shift operation in dependence upon the shift operation, which is provided in the second phase, that is, the new gear stage which is to be set so that this first torque reserve MRES1 can, if required, be used in the second phase, as required, as a second torque reserve MRES2. The time for the formation of the second pregiven torque reserve MRES2 in the second phase can be shortened in this way as already described. In this way, the second phase, can, overall, be shortened. The shift operation is therewith overall accelerated. Accordingly, if, at the beginning of the first phase of the shift operation, it is already known that downshifting will occur in the second phase then, in the first phase, an increased first reserve torque MRES1 can be pregiven which is available for the necessary rpm increase in the second phase already at the first time point $t_1$. If, in the first phase, it is already known to which desired value NMOTDES the engine rpm is to be increased in the second phase of the shift operation, then, in the first phase of the shift operation, the second torque reserve MRES2 can already be pregiven in the first phase of the shift operation according to the block circuit diagram of FIG. 7. The second pregiven torque reserve MRES2 is therefore pregiven for the first phase as well as for the second phase of the shift operation, that is, it is the same for the first and second phases of the shift operation. In the first phase of the shift operation, the second pregiven torque reserve MRES2 is built up in that the ignition angle is retarded and/or the injection quantity is reduced. In this way, the torque reduction is considerably accelerated in the first phase. While according to FIG. 3, the total torque MGES is reduced simultaneously via charge reduction, the second pregiven torque reserve MRES2 is built up and therefore increased. This leads to a rapid drop of the charge magnitude which is still available for the realization of the desired value MDES of the engine output torque. At the latest, at the end of the first phase (that is, at time point $t_1$), the pregiven second torque reserve MRES2 is available so that the rpm increase can immediately be started.

If it is already known in the first phase of the shift operation that upshifting will take place in the second phase, then there will be a drop of the desired value NMOTDES of the engine rpm in the second phase wherefor no torque reserve is required. The reduction of the rpm is logically coupled to a reduction of the engine output torque. Only when the lower engine rpm is adjusted and must be held, a slight increase of the engine output torque is again required toward the end of the second phase as shown in FIG. 2*a*. For this case, the second pregiven torque reserve MRES2 can be provided in order to realize as rapidly as possible this increase of the desired value MDES of the engine output torque toward the end of the second phase. In this case, the second pregiven torque reserve can, however, still be built up easily within the second phase because a torque drop is first present. This torque drop can be realized in the same way as in the previously described first phase and can be realized for forming the second pregiven torque reserve MRES2. In this case, the second pregiven torque reserve MRES2 also must no longer be pregiven in dependence upon the rpm difference but in dependence upon the torque difference to be realized at the end of the second phase between the actual value MACT and the desired value MDES of the engine output torque and therefore as described in FIG. 5 or in FIG. 6. In this way, the formation of the second pregiven torque reserve MRES2 is not required already in the first phase of the shift operation so that there the adaptation between the actual value MACT and the desired value MDES of the engine output torque can take place in accordance with variation 1 almost completely via the charge path and, in this way as little raw emissions as possible occur.

In the third phase of the shift operation, which starts at the second time point $t_2$, the clutch is closed at constant desired value NMOTDES for the engine rpm and the desired value MDES for the engine output torque is again increased to the driver command torque MFW. The actual value MACT of the engine output torque is to track as rapidly as possible the driver command torque MFW as shown in FIG. 2*a* by the broken line. This can take place via a third pregiven torque reserve MRES3 which is determined as also the first pregiven torque reserve MRES1 in accordance with FIG. 5 or 6. The third pregiven torque reserve MRES3 is formed as rapidly as possible at the start of the third phase starting from the second time point $t_2$, as described on the ignition angle path and/or on the injection path.

Figure 8:
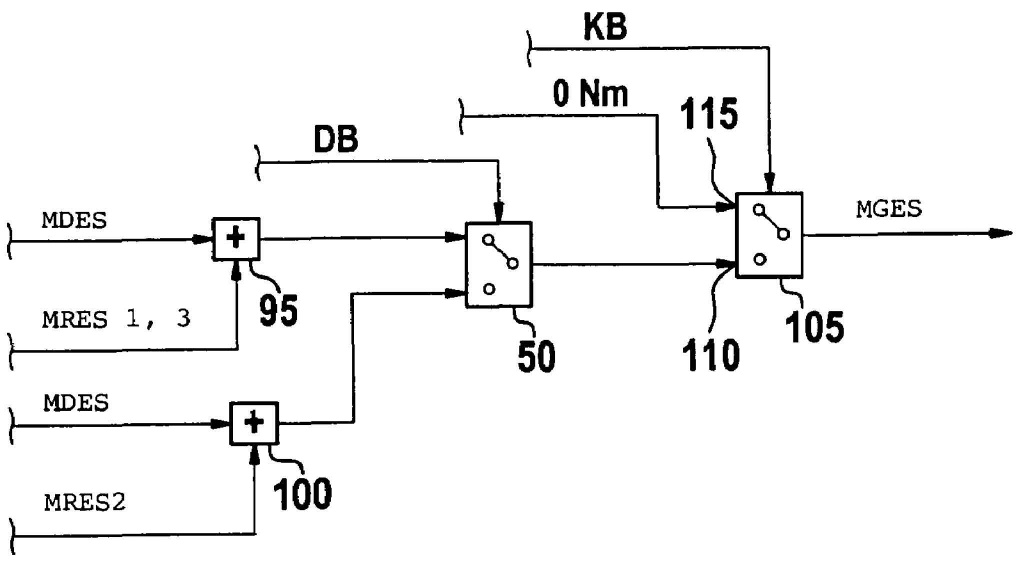
FIG. 8 is a block circuit diagram for selecting the torque reserve in dependence upon the particular phase of the shift operation; and, FIG. 9 is a block circuit diagram for the configuration of the arrangement of the invention.

In. FIG. 8, a block circuit diagram is shown for selecting the total torque MGES for the individual phases of the shift operation. This block circuit diagram is likewise realized in the engine control 20. In addition to the clutch bit KB (which indicates whether a shift operation is present), the engine control 20 furthermore is supplied with an rpm bit DB which indicates whether the engine control phase is active, that is, the second phase of the shift operation. The clutch bit KB and the rpm bit DB are supplied by the transmission control 5 to the engine control 20. In a seventh logic position 95, the instantaneous desired value MDES of the engine output torque is added to the instantaneous torque reserve. Only the desired values MDES for the engine output torque, which are supplied directly by the transmission control 5, are considered. They are present in the first and third phases of the shift operation. Accordingly, the instantaneous pregiven torque reserves are the first or the third pregiven torque reserves (MRES1, MRES3). In the second phase of the shift operation, the transmission control 5 supplies the desired value NMOTDES for the engine rpm from which the engine control 20 then determines the particular required torque value MDES for the engine output torque which is needed in order to adjust the desired value NMOTDES for the engine rpm. The additive logic coupling of the instantaneous desired value MDES of the engine output torque to the second torque reserve MRES2 takes place in an eighth logic position 100. The second torque reserve MRES2 is pregiven in the second phase of the shift operation. A first controlled switch 50 connects either the output of the seventh logic position 95 or the output of the eighth logic position 100 to a first input 110 of a second controlled switch 105. The first controlled switch 50 is controlled by the rpm bit DB. During the first phase of the shift operation, the rpm bit DB is set and drives the first controlled switch 50 in such a manner that this switch connects the output of the eighth logic position 100 to the first input 110 of the second controlled switch 105. Otherwise, the rpm bit DB is reset and drives the first controlled switch 50 in such a manner that this switch connects the output of the seventh logic position 95 to the first input 110 of the second controlled switch 105. The second controlled switch 105 has the value zero Nm at a second input 115. The second controlled switch 105 is controlled by the clutch bit KB. This clutch bit KB is set during the shift operation. In the set state, the clutch bit KB drives the second controlled switch 105 in such a manner that the switch connects the first input 110 to its output. Outside of the shift operation, the clutch bit KB is reset and drives the second controlled switch 105 in such a manner that this switch connects the second input 115 to its output. In this way, during the shift operation, the total torque MGES is output at the output of the second switch 105. The total torque MGES is formed from the sum of the instantaneous desired value MDES of the engine output torque and the just then instantaneous torque reserves (MRES1, MRES2, MRES3). Otherwise, the value zero Nm is outputted at the output of the second switch 105. It can then be provided that the engine control 20 realizes the total torque value MGES via the charge path and therefore the air supply with the output of a value unequal to zero at the output of the second controlled switch 105. If the value zero is outputted at the Output of the second controlled switch 105, then the engine control 20 checks whether a torque request is present from the other modules of the vehicle, for example, from the accelerator pedal 25, in order to realize this request, for example, the driver command torque MFW.

Figure 9:
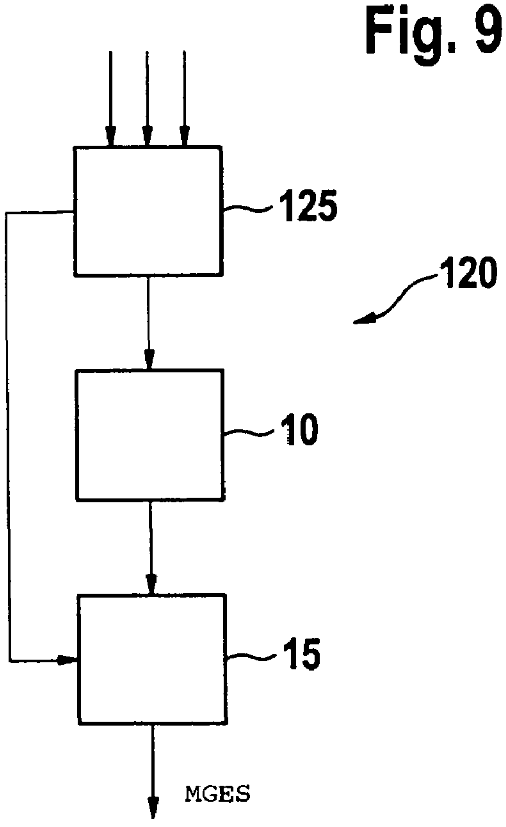

In FIG. 9, a block circuit diagram is provided for the arrangement of the invention which can likewise be implemented in the engine control 20 and is identified in FIG. 9 with reference numeral 120. The arrangement 120 includes means 125 for receiving the desired value MDES of the engine output torque, especially from the transmission control 5 and of the actual value NMOTACT of the engine rpm from the rpm sensor 30. The means 125 furthermore receive the driver command torque MFW from the accelerator pedal 25. The means 125 furthermore receive the rpm bit DB from the transmission control 5 and the clutch bit KB. The means 125 are connected to means 10 for inputting the torque reserve in accordance with the block circuit diagram of FIG. 5, FIG. 6 or FIG. 7. The means 125 and the means 10 are connected to means 15 for determining the total torque MGES in accordance with the block circuit diagram of FIG. 8. The total torque MGES is realized via the charge path in the manner described.

With the method of the invention and the arrangement of the invention, the shift operation and therefore the disadvantageous interruption of the power connection between the engine and the drive train of the vehicle is accelerated during the shift operation of the transmission. To consider the instantaneous driving situation in the formation of the particular torque reserve the driver command torque MFW and the actual value NMOTACT of the engine rpm are presented by way of example. In addition, or alternatively, additional quantities can be considered in the formation of the particular torque reserve, which quantities describe the driving state, the transmission ratio, the type of driver and/or the driving behavior (for example, spontaneous or economical). As to the driving state and the transmission ratio, these quantities can be measured by suitable measuring devices and, as to the type of driver and the driver behavior, these quantities can be learned from previous driving situations.

For drivers who want a more rapid or more spontaneous response performance of the vehicle, a higher respective torque reserve in the corresponding phases of the shift operation can be made available than for drivers who value a more economic driving style. A higher driver command torque MFW or a higher actual value NMOTACT of the engine rpm can be so interpreted and can be so realized by the first characteristic field 35, the second characteristic field 55 or the third characteristic field 90 that a larger particular torque reserve is formed in the individual phases of the shift operation because the assumption was of a driver having a desire for a more spontaneous response performance of the vehicle. For a lower driver command torque MFW or a lower actual value NMOTACT of the engine rpm, one proceeds instead from a driver concerned with respect to consumption and a corresponding lower particular torque reserve for the individual phases of the shift operation is pregiven by the first characteristic field 35, the second characteristic field 55 and the third characteristic field 90.

It is understood that the foregoing description is that of the preferred embodiments of the invention and that various changes and modifications may be made thereto without departing from the spirit and scope of the invention as defined in the appended claims.

What is claimed is:

1. A method for controlling an internal combustion engine of a vehicle, the method comprising the steps of:

inputting an operating state quantity of said engine; and, inputting a torque reserve (MRES1, MRES2, MRES3) for a rapid setting of said operating state quantity by rapid torque increase utilizing said torque reserve.

2. The method of claim 1, wherein said engine has an automatic transmission or an automated manual shift transmission and said operating state quantity is inputted when there is a shift operation; and, said operating state quantity is an engine output torque (MDES) or an engine rpm (NMOTDES).

3. The method of claim 2, comprising the further step of inputting said torque reserve (MRES1, MRES2, MRES3) in dependence upon a difference between said pregiven operating state quantity and an instantaneous value of said operating state quantity.

4. The method of claim 2, comprising the further step of inputting said torque reserve MRES1, MRES2, MRES3) in dependence upon a driver command torque (MFW) or an instantaneous engine rpm (NMOTACT).

5. The method of claim 2, wherein an ignition angle is defined for said engine and said method comprises the further step of setting the torque reserve (MRES1, MRES2, MRES3) by shifting the ignition angle.

6. The method of claim 5, wherein the ignition angle is shifted by retarding said ignition angle.

7. A method for controlling an internal combustion engine of a vehicle, the method comprising the steps of:

inputting an engine output torque (MDES) or an engine rpm (NMOTDES);

inputting a torque reserve (MRES1, MRES2, MRES3) for a rapid setting of said engine output torque (MDES) or said engine rpm (NMOTDES);

inputting said torque reserve (MRES1, MRES2, MRES3) in dependence upon at least one of the following: an instantaneous phase of the shift operation and a subsequent phase of the shift operation; and, wherein said engine has an automatic transmission or an automated manual shift transmission and said engine output torque (MDES) or said engine rpm (NMOTDES) is inputted when there is a shift operation.

8. The method of claim 2, comprising the further step of inputting a first torque reserve (MRES1) in a first phase of a shift operation wherein a clutch is opened.

9. A method for controlling an internal combustion engine of a vehicle, the method comprising the steps of:

inputting an engine output torque (MDES) or an engine rpm (NMOTDES) of said engine;

inputting a torque reserve (MRES1, MRES2, MRES3) for a rapid setting of said engine output torque (MDES) or said engine rpm (NMOTDES);

inputting a first torque reserve (MRES1) in a first phase of a shift operation wherein a clutch is opened;

inputting a second torque reserve (MRES2) in a second phase of a shift operation wherein a new gear stage is set; and, wherein said engine has an automatic transmission or an automated manual shift transmission and said engine output torque (MDES) or said engine rpm (NMOTDES) is inputted when there is a shift operation.

10. The method of claim 9, comprising the further step of inputting the first torque reserve (MRES1) in dependence upon the new gear stage.

11. A method for controlling an internal combustion engine of a vehicle, the method comprising the steps of:

inputting an engine output torque (MDES) or an engine rpm (NMOTDES);

inputting a torque reserve (MRES1, MRES2, MRES3) for a rapid setting of said engine output torque (MDES) or said engine rpm (NMOTDES);

wherein said engine has an automatic transmission or an automated manual shift transmission and said engine output torque (MDES) or said engine rpm (NMOTDES) is inputted when there is a shift operation; and, said torque reserve includes a first torque reserve (MRES1) and a second torque reserve (MRES2) and the method includes the further step of inputting said second torque reserve (MRES2) in a second phase of a shift operation wherein a new gear stage is set.

12. A method for controlling an internal combustion engine of a vehicle, the method comprising the steps of:

inputting an engine output torque (MDES) or an engine rpm (NMOTDES);

inputting a torque reserve (MRES1, MRES2, MRES3) for a rapid setting of said engine output torque (MDES) or said engine rpm (NMOTDES);

wherein said engine has an automatic transmission or an automated manual shift transmission and said engine output torque (MDES) or said engine rpm (NMOTDES) is inputted when there is a shift operation; and, said torque reserve includes a first torque reserve (MRES1), a second torque reserve (MRES2) and a third torque reserve (MRES3); and said method includes the further step of inputting said third torque reserve (MRES3) in a third phase of a shift operation wherein a clutch is closed.

13. An arrangement for controlling an internal combustion engine of a vehicle, the arrangement comprising:

means for inputting an operating state quantity of said engine; and, means for inputting a reserve torque (MRES1, MRES2, MRES3) for a rapid setting of said operating state quantity by rapid torque increase utilizing said torque reserve.

14. The arrangement of claim 13, wherein said engine has an automatic transmission or an automated manual shift transmission; and, said means for inputting said operating state quantity functioning to input said operating state quantity when there is a shift operation; and, wherein said operating state quantity is an engine output torque (MDES) or an engine rpm (NMOTDES).

* * * * *